United States Patent
Sun et al.

(10) Patent No.: US 9,225,468 B1
(45) Date of Patent: Dec. 29, 2015

(54) SYSTEMS AND METHODS FOR DETECTING DATA IN A RECEIVED MULTIPLE-INPUT-MULTIPLE-OUTPUT (MIMO) SIGNAL

(71) Applicant: Marvell International Ltd., Hamilton (BM)

(72) Inventors: Yakun Sun, Sunnyvale, CA (US); Zheng Zhang, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 3 days.

(21) Appl. No.: 14/230,650

(22) Filed: Mar. 31, 2014

Related U.S. Application Data (60) Provisional application No. 61/807,163, filed on Apr. 1, 2013.

(51) Int. Cl.
*H04B 7/02* (2006.01)
*H04L 1/02* (2006.01)
*H04L 1/00* (2006.01)

(52) U.S. Cl.
CPC ............ *H04L 1/0048* (2013.01); *H04L 1/0054* (2013.01); *H04L 1/0055* (2013.01)

(58) Field of Classification Search
CPC . H04L 25/03006; H04L 25/067; H04L 27/38; H04L 1/005; H04L 1/0052; H03M 13/256; H03M 13/258; H03M 13/2957
See application file for complete search history.

(56) References Cited

U.S. PATENT DOCUMENTS

| | | | |
|---|---|---|---|
| 6,731,700 B1* | 5/2004 | Yakhnich et al. ............. | 375/341 |
| 6,986,093 B2* | 1/2006 | Itakura ......................... | 714/755 |
| 8,467,466 B2 | 6/2013 | Bjerke et al. | |
| 8,483,328 B2 | 7/2013 | van Nee et al. | |
| 2003/0103584 A1* | 6/2003 | Bjerke et al. ................... | 375/340 |
| 2005/0010848 A1* | 1/2005 | Yokokawa et al. ............ | 714/755 |
| 2005/0135498 A1* | 6/2005 | Yee ................................ | 375/267 |
| 2005/0166132 A1* | 7/2005 | Shen et al. ..................... | 714/801 |
| 2006/0188044 A1* | 8/2006 | Wang et al. .................... | 375/347 |
| 2007/0041475 A1* | 2/2007 | Koshy et al. ................... | 375/340 |
| 2007/0260959 A1 | 11/2007 | Sidi et al. | |
| 2008/0279298 A1* | 11/2008 | Ben-Yishai et al. .......... | 375/261 |
| 2008/0279299 A1* | 11/2008 | Reuven et al. ................ | 375/267 |
| 2009/0067553 A1* | 3/2009 | McElwain .................... | 375/341 |
| 2010/0183065 A1* | 7/2010 | Siti et al. ....................... | 375/233 |
| 2011/0051831 A1* | 3/2011 | Subrahmanya et al. ...... | 375/262 |
| 2013/0156139 A1* | 6/2013 | Lee et al. ....................... | 375/341 |
| 2013/0272462 A1* | 10/2013 | Siti et al. ....................... | 375/341 |

OTHER PUBLICATIONS

Jungwon Lee; Choi, Ji-Woong; Hui-Ling Lou; Jongsun Park, "Soft MIMO ML demodulation based on bitwise constellation partitioning," Communications Letters, IEEE , vol. 13, No. 10, pp. 736,738, Oct. 2009.*

* cited by examiner

*Primary Examiner* — Daniel Washburn
*Assistant Examiner* — Amneet Singh (57) ABSTRACT

Systems and methods for detecting data in a received signal are provided. A signal that represents a set of data symbols is received. Possible bit values for a single data symbol of the set of data symbols are determined based on the received signal. Possible bit values for other data symbols of the set of data symbols are determined based on the possible bit values for the single data symbol. The determining of the possible bit values for the other data symbols includes determining a first value for each bit included in the other data symbols. The first value is determined by combining i) a first soft metric indicating a likelihood of a state of the bit given the received signal, and ii) a second soft metric representing an a priori probability (APP) for the bit. The first soft metric is not based on the APP for the bit.

20 Claims, 5 Drawing Sheets

FIG. 1

FIG. 2A $$y(k) = H(k)x(k) + n(k) = \begin{bmatrix} h_1(k) & \cdots & h_M(k) \end{bmatrix} \begin{bmatrix} x_1(k) \\ \vdots \\ x_M(k) \end{bmatrix} + n(k)$$

x: symbol vector $M$ streams $h_i$: effective channel for the $i^{th}$ stream $n \sim CN(0, \sigma^2 I)$

SYSTEMS AND METHODS FOR DETECTING DATA IN A RECEIVED MULTIPLE-INPUT-MULTIPLE-OUTPUT (MIMO) SIGNAL

CROSS-REFERENCE TO RELATED APPLICATIONS

This disclosure claims priority to U.S. Provisional Patent Application No. 61/807,163, filed on Apr. 1, 2013, which is incorporated herein by reference in its entirety.

TECHNICAL FIELD

The technology described in this document relates generally to communication and more particularly to techniques for performing detection and decoding at a receiver in a communication system.

BACKGROUND

The wireless communication industry has demonstrated an increasing interest in multiple-input-multiple-output (MIMO) systems. For example, MIMO beamforming systems have been considered in standards promulgated by the Institute of Electrical and Electronics Engineers (IEEE), most notably the IEEE 802.11n standard for wireless local area networks (WLANs). Beamforming methodologies increase the data rate between networked devices without an attendant increase in transmit power or bandwidth that would be necessary to achieve a similar data rate in MIMO systems without beamforming. Spatial multiplexing techniques for MIMO systems have also been considered in several standards such as the IEEE 802.11a/g standard. One advantage of spatial multiplexing is that it can increase channel capacity at high signal to noise ratios (SNRs).

SUMMARY

The present disclosure is directed to systems and methods for detecting data in a received multiple-input-multiple-output (MIMO) signal. In an example method for detecting data in a received MIMO signal, a signal that represents a set of data symbols transmitted over a communication channel is received. Possible bit values for a single data symbol of the set of data symbols are determined based on the received signal. Possible bit values for other data symbols of the set of data symbols are determined based on the possible bit values for the single data symbol. Determining the possible bit values for the other data symbols includes determining a first value for each bit included in the other data symbols. The first value is determined by combining i) a first soft metric indicating a likelihood of a state of the bit given the received signal, and ii) a second soft metric representing an a priori probability (APP) for the bit that is received from a decoder. The first soft metric is not based on the APP for the bit. The possible bit values for the other data symbols are determined based on the first values.

In another example, a system for detecting data in a received MIMO signal includes one or more antennas configured to receive, via a communication channel, a signal that represents a set of data symbols transmitted over the communication channel. The system also includes a detector coupled to the one or more antennas. The detector is configured to determine possible bit values for a single data symbol of the set of data symbols based on the received signal. The detector is also configured to determine possible bit values for other data symbols of the set of data symbols based on the possible bit values for the single data symbol. Determining the possible bit values for the other data symbols includes determining a first value for each bit included in the other data symbols. The first value is determined by combining i) a first soft metric indicating a likelihood of a state of the bit given the received signal, and ii) a second soft metric representing an a priori probability (APP) for the bit that is received from a decoder. The first soft metric is not based on the APP for the bit. Determining the possible bit values for the other data symbols also includes determining the possible bit values for the other data symbols based on the first values.

DETAILED DESCRIPTION

Figure 1:
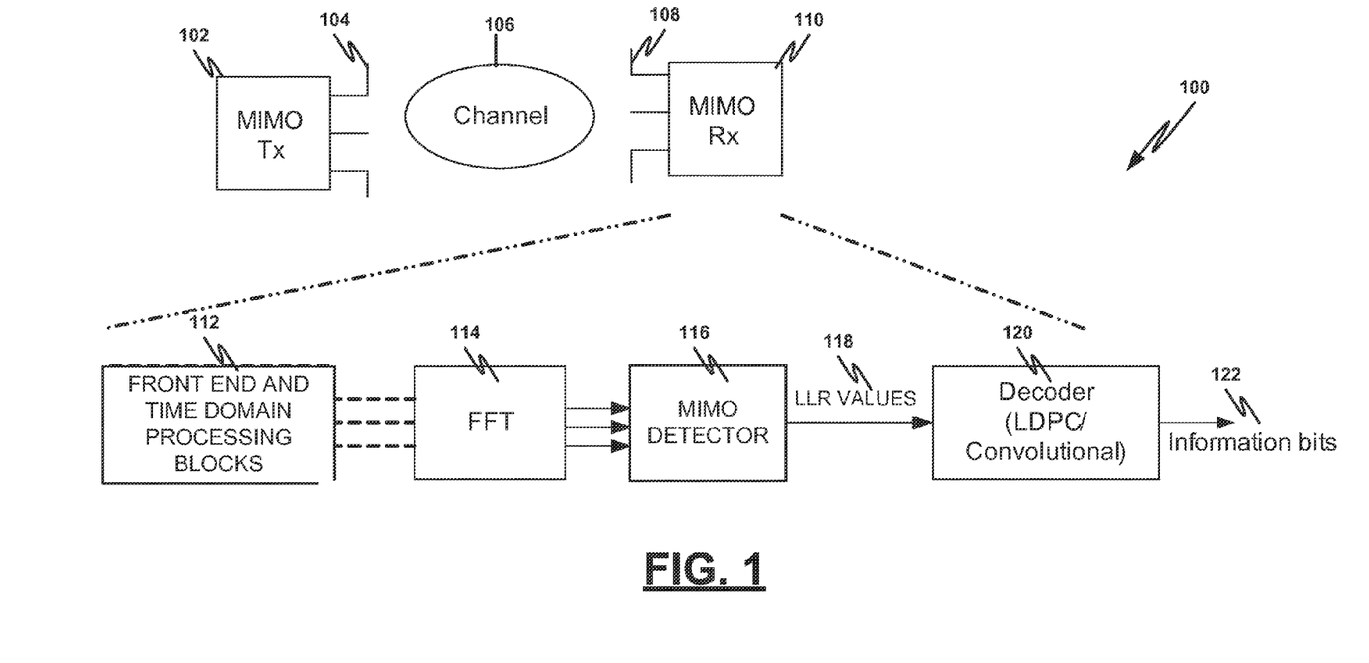
FIG. 1 is a block diagram of an example multiple-input-multiple-output (MIMO) communication system including a MIMO transmitter, MIMO receiver, and channel.

FIG. 1 is a block diagram 100 of an example multiple-input-multiple-output (MIMO) communication system including a MIMO transmitter 102, MIMO receiver 110, and channel 106. The MIMO communication system allows more than one spatial stream to be transmitted, and in the example of FIG. 1, three spatial streams are used. In the MIMO transmitter 102, data to be transmitted is provided as a stream of 1's and 0's to one or more encoders. The one or more encoders encode the data to be transmitted with, for example, an error correcting code. The outputs of the one or more encoders are modulated into symbols based on a certain constellation (e.g., QAM, PSK), and the modulated symbols are provided to a spatial stream splitter and divided into three spatial streams. These spatial streams are then propagated to a frequency modulator and frequency modulated into symbols, which are represented as a sequence of complex numbers. The frequency modulated signals are then sent through three antennas 104 and transmitted through the transmission channel 106. In an example, the transmission channel 106 includes air. The three antennas 104 correspond to the three spatial streams to be transmitted. In other examples, fewer than three antennas are used, or more than three antennas are used.

In the example illustrated in FIG. 1, using three antennas 108, the MIMO receiver 110 receives the three spatial stream signals from the transmission channel 106. In the MIMO receiver 110, the received spatial streams are processed by front end and time domain processing blocks 112 (e.g., analog-to-digital conversion blocks, digital-to-analog conversion blocks, etc.). The output of the front end and time domain processing blocks 112 is provided to a fast Fourier Transform (FFT) module 114 and converted from a time domain representation to a frequency domain representation. The use of the front end and time domain processing blocks 112 and the FFT module 114 is exemplary only, and in other examples, the modules 112, 114 are not used or are replaced with other modules. The converted spatial streams are then propagated to a MIMO detector 116. The MIMO detector 116 calculates log-likelihood ratio (LLR) values 118 for each of the received spatial streams. The MIMO detector 116 operates in the frequency domain and is configured to remove channel effects on the received spatial streams. The LLR values 118 are soft bit metric values that represent a probability of a received bit being a "1" or a "0." The calculated LLR values 118 are combined by a LLR combiner and provided to a decoder 120. In an example, the decoder 120 is a low-density parity-check (LDPC) decoder or a convolutional decoder. Various other types of decoders are used in other examples. The decoder 120 decodes the received spatial streams using the LLR values provided by the combiner and generates informational bits output data 122. As described in further detail below, the decoder 120 provides feedback to the MIMO detector 116 in the form of a priori probability (APP) LLR values.

In an example, the MIMO detector 116 is a maximum a-posterior probability (MAP) detector. The MAP detector is a soft-input-soft-output MIMO detector that generates the soft bit metric outputs 118 using an algorithm that has a low computational complexity. The soft bit metric outputs 118 are multi-bit values that are estimates of transmitted code bits. The MAP detector 116 offers substantially identical error performance as compared to techniques having higher complexity. The decoder 120 that receives the soft bit metric outputs 118 from the MAP detector 116 performs better than decoders in alternative systems that receive hard inputs.

As described in further detail below, the MAP detector 116 uses an LLR combining technique to determine the LLR values 118 that are output to the decoder 120. Specifically, a digital signal received at the receiver 110 represents a set of data symbols transmitted over the communication channel 106. The MAP detector 116 determines possible bit values for a single data symbol (e.g., $x_i$) of the set of data symbols based on the received digital signal. Given the possible bit values for the single data symbol, the MAP detector 116 determines possible bit values for other data symbols (e.g., $x_{[i]}$) of the set of data symbols. Determining the possible bit values for the other data symbols includes combining i) a first soft metric indicating a likelihood of a state of a bit given the received signal, and ii) a second soft metric representing an a priori probability (APP) for the bit. The APP for the bit is received from the decoder 120, and the first soft metric is not based on the APP for the bit. The LLR combining technique employed by the MAP detector 116 is described in greater detail below with reference to FIGS. 2A-5.

Figure 2A:
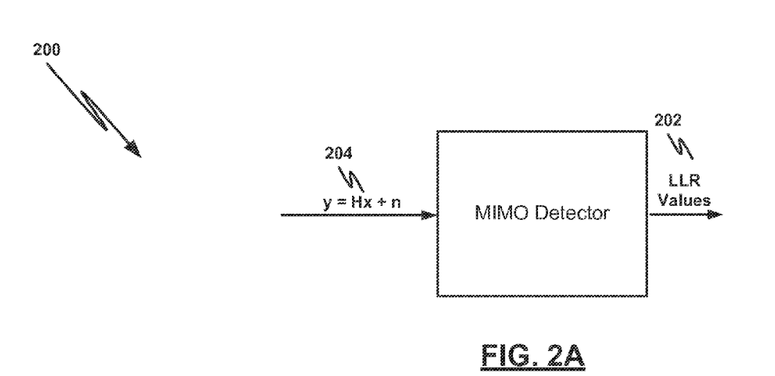
FIGS. 2A and 2B depict aspects of a system model for a MIMO detector configured to output a soft bit metric based on a received signal.
Figure 2B:
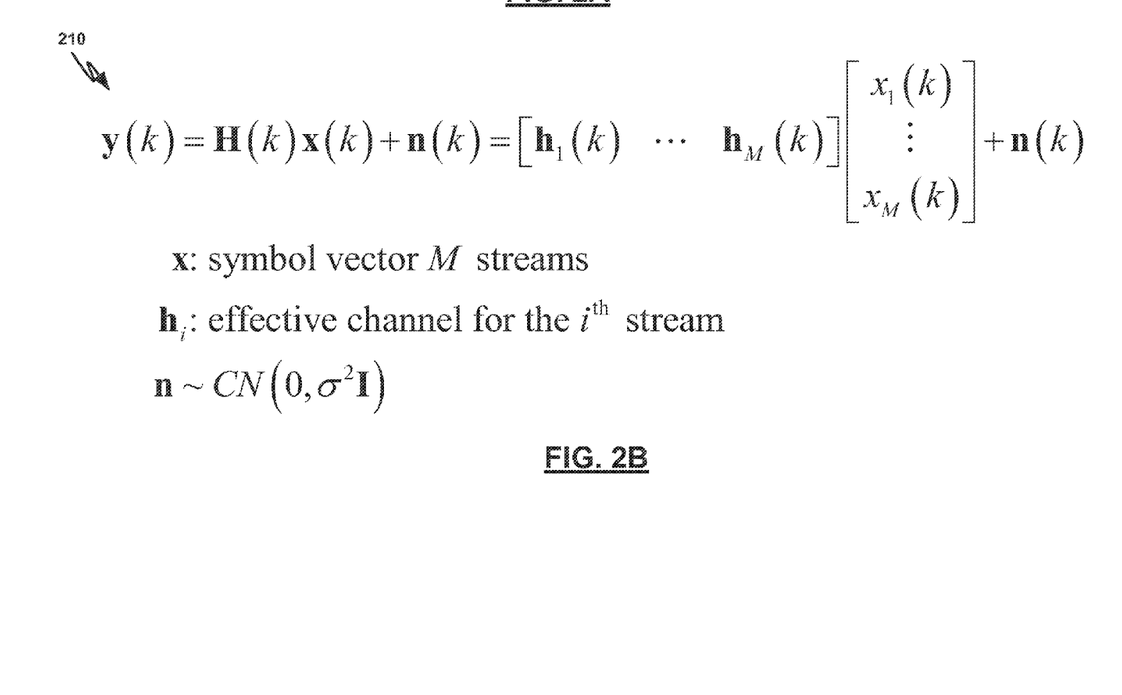

FIGS. 2A and 2B depict aspects of a system model for a MIMO detector 200 configured to output a soft bit metric 202 based on a received signal 204. The MIMO detector 200 receives, via one or more antennas, a plurality of signals that are transmitted through a communication channel. For example, a MIMO communication system employs multiple (T) transmit antennas at a transmitter and multiple (R) receive antennas at a receiver for data transmission. A MIMO channel formed by the T transmit antennas and the R receive antennas is decomposed into M spatial channels, where M≤min {T, R}. M data streams are sent on the M spatial channels.

In the example of FIG. 1 including the three antennas 108, a first data stream, a second data stream, and a third data stream are transmitted through the channel 106. The MIMO detector 200 computes LLR values 202 based on the received signals 204. Specifically, the received signals 204 are represented by the equation y=Hx+n, where y represents the received signals at the MIMO detector 200, x represents the data values of the symbols in the data streams transmitted by the MIMO transmitter, H is a channel matrix representing combined effects of the transmission channel and spatial mapping of the MIMO transmitter on the transmitted signal, and n represents noise. In the three spatial stream case, y is a 3×1 vector ($[y_1, y_2, y_3]^T$), x is a 3×1 vector ($[x_1, x_2, x_3]^T$), H is a 3×3 vector $$\begin{bmatrix} h_{11} & h_{12} & h_{13} \\ h_{21} & h_{22} & h_{23} \\ h_{31} & h_{32} & h_{33} \end{bmatrix},$$

and n is a 3×1 vector ($[n_1, n_2, n_3]^T$). Thus, a 3×3 MIMO system, with the three spatials streams, as illustrated in the example of FIG. 1, is described by the following equation:

$$\underbrace{\begin{bmatrix} y_1 \\ y_2 \\ y_3 \end{bmatrix}}_{y} = \underbrace{\begin{bmatrix} h_{11} & h_{12} & h_{13} \\ h_{21} & h_{22} & h_{23} \\ h_{31} & h_{32} & h_{33} \end{bmatrix}}_{H} \underbrace{\begin{bmatrix} x_1 \\ x_2 \\ x_3 \end{bmatrix}}_{x} + \underbrace{\begin{bmatrix} n_1 \\ n_2 \\ n_3 \end{bmatrix}}_{n}.$$

A more general representation of the symbols received at the MIMO detector 200 is illustrated at 210 in FIG. 2B, where the more general representation is expressed as:

$$y(k) = H(k)x(k) + n(k) = [h_1(k) \ \ldots \ h_M(k)] \begin{bmatrix} x_1(k) \\ \vdots \\ x_M(k) \end{bmatrix} + n(k) \quad \text{(Equation 1)}$$

where y(k) is an R×1 vector with R symbols received at the MIMO detector 200 for an index k, x(k) is an M×1 vector with M data streams transmitted over the channel for the index k, H(k) is an R×M MIMO channel response matrix for the index k, $h_i$ represents an effective channel for the i-th stream of the M data streams, and n(k) is an R×1 vector representing a noise component of the received signal y for the index k. In an example, the index k corresponds to a frequency, as in an orthogonal frequency-division multiplexing (OFDM) system. In another example, the index k corresponds to a symbol, as in a single-carrier system. In yet another example, the index k corresponds to another transmission opportunity. The index k is omitted in the following description for clarity. As indicated at 210, the matrix n is modeled as a complex white Gaussian noise with a zero mean vector and a covariance matrix of $\sigma^2 I$, where $\sigma^2$ is the variance of the noise and I is the identity matrix, i.e., n~CN(0, $\sigma^2 I$). The use of the identity matrix in the noise covariance matrix is merely exemplary and is not used in all examples. In another example where the covariance matrix is not an identity matrix, a noise-whitening operation is performed on the received signals and the channel matrices to transform the noise to be white.

The outputs of one or more encoders are partitioned into multiple blocks, with each block containing K code bits. The K code bits for each block are mapped to M data symbols, as follows:

$$x = \text{map}(b), \quad \text{(Equation 2)}$$

where x=[$x_1 x_2 \ldots x_M$] is a vector with M data symbols, b=[$b_1 b_2 \ldots b_K$] is a vector with K code bits for one block, and $b_k$ for k=1, ..., K, is the k-th code bit in the vector b.

An optimal receiver for the transmission scheme illustrated in FIGS. 1, 2A, and 2B is a maximum likelihood (ML) sequence receiver that performs detection and decoding jointly for an entire packet. The optimal receiver makes joint decisions on all data bits in the packet using knowledge of the correlation introduced by the coding scheme across the blocks, subbands, or OFDM symbols for the packet. The optimal receiver performs an exhaustive search over all possible sequences of data bits that might have been transmitted for the packet to find the sequence that is most likely to have been transmitted. Due to the exhaustive search and other aspects of the optimal receiver, the optimal receiver has a high computational complexity.

The MIMO detector 200 of FIG. 2A achieves near-optimal performance with lower complexity than the optimal receiver. The MIMO detector 200 outputs soft bit metrics 202 for each received signal, and the soft bit metrics 202 are typically log likelihood ratio (LLR) values. In an embodiment, the MIMO detector 200 is a maximum a posteriori probability (MAP) detector that minimizes the error probability for each code bit and provides a soft decision for each code bit. The detector LLR for a code bit $b_n$, $L(b_n)$, is expressed as:

$$\underbrace{LLR = \log \frac{P(b_n = 1 \mid y)}{P(b_n = 0 \mid y)}}_{\text{soft decision}} \Rightarrow \underbrace{b_n = 1 \Leftrightarrow LLR > 0}_{\text{hard decision}}, \quad \text{(Equation 3)}$$

where $P(b_n=1|y)$ is the probability of the code bit $b_n$ being "1" given the received vector y, and $P(b_n=0|y)$ is the probability of the code bit $b_n$ being "0" given the received vector y. As indicated in Equation 3, in systems that use hard decisions, a hard decision is generated based on the detector LLR value. In the example of FIGS. 2A and 2B, the code bit $b_n$ is determined to be "1" if the detector LLR value is greater than zero.

The detector LLR is separated into two parts as follows:

$$L(b_n) = L_A(b_n) + L_E(b_n), \quad \text{(Equation 4)}$$

where $L_A(b_n)$ is the a priori probability (APP) LLR for the code bit $b_n$ that is provided by a decoder (e.g., the decoder 120 of FIG. 1), and $L_E(b_n)$ is the extrinsic LLR for code bit $b_n$ that is provided by the MIMO detector 200 to the decoder. In an example, the APP LLR is provided as feedback to the MIMO detector 200 from the decoder. In the example, the MIMO detector 200 uses the APP feedback to update the detector LLR. The use of the APP LLR value to update the detector LLR is described in further detail below with reference to FIGS. 3 and 4.

Figure 3:
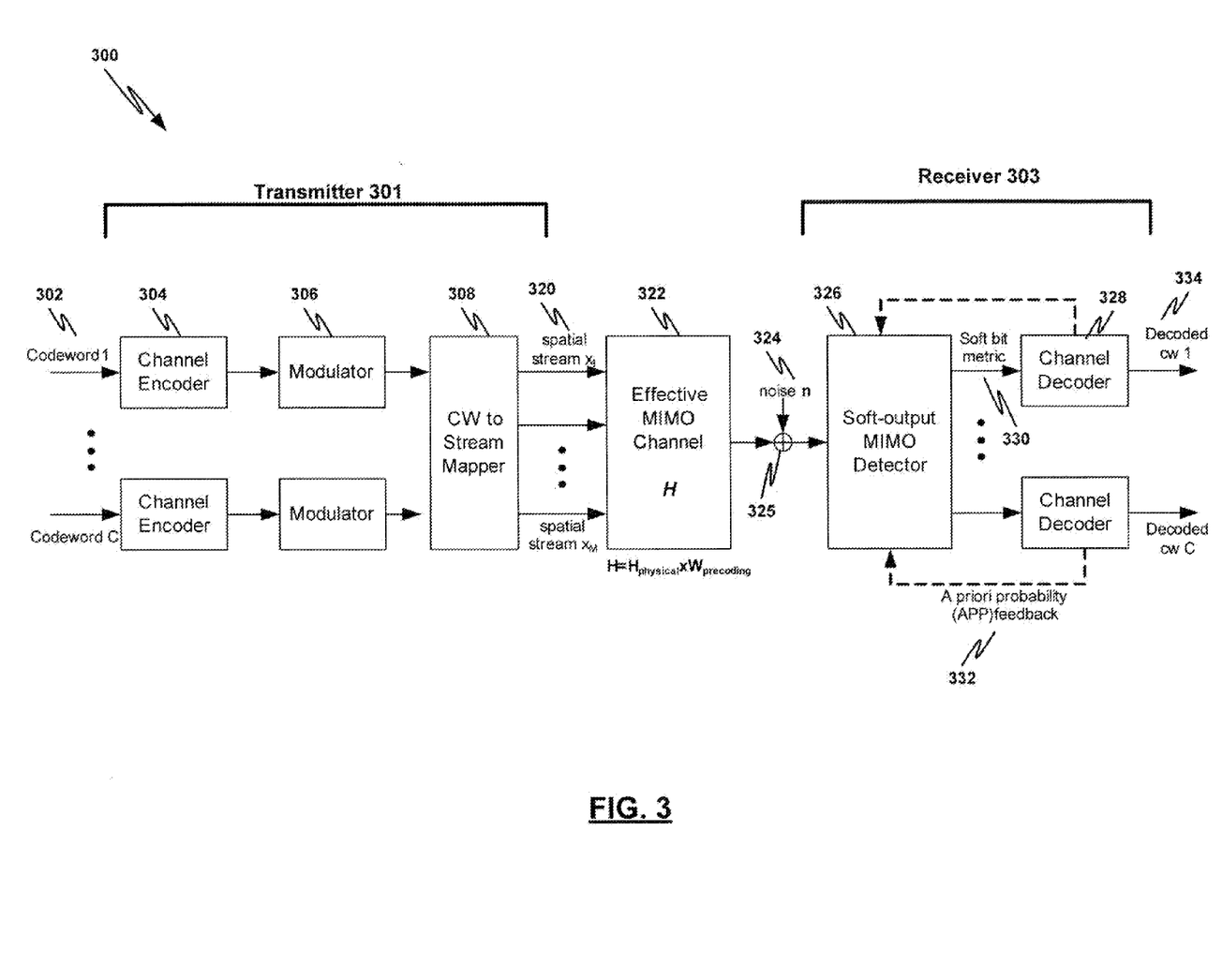
FIG. 3 is a block diagram of an example MIMO communication system including a soft-output MIMO detector that is configured to receive a priori probability (APP) feedback from a channel decoder.

FIG. 3 is a block diagram 300 of an example MIMO communication system including a soft-output MIMO detector 326 that is configured to receive a priori probability (APP) feedback 332 from a channel decoder 328. For clarity, the following description assumes that M data streams are sent on M spatial channels. In FIG. 3, transmitter 301 includes multiple (T) antennas, and receiver 303 includes multiple (R) antennas. The receiver 303 is part of, and contains some or all of the functionality of, a mobile station, a user terminal, or a user equipment, and so on.

At the transmitter 301, codeword data 302 is received from a data source and processed (e.g., formatted, encoded, interleaved, etc.) to generate M data symbols, which are modulation symbols for the codeword data 302. The M data symbols are multiplexed with pilot symbols, which are modulation symbols for a pilot, where the pilot is a transmission that is known a priori by both the transmitter 301 and the receiver 303. In the MIMO transmitter 301, the codeword data 302 to be transmitted is provided as streams of 1's and 0's to channel encoders 304. The channel encoders 304 encode the codeword data 302 in accordance with a coding scheme and generate code bits. The coding scheme is a convolutional code, a Turbo code, a low density parity check (LDPC) code, a cyclic redundancy check (CRC) code, a block code, or a combination thereof. Outputs of the encoders 304 are provided to modulators 306. Using the modulators 306, the outputs of the encoders 304 are modulated into M data symbols based on a constellation (e.g., QAM, PSK), and the M modulated data symbols are provided to a codeword-to-stream mapper 308 that maps the M data symbols to M spatial streams 320.

The M spatial streams 320 are then propagated to a frequency modulator and frequency modulated into symbols, which are represented as a sequence of complex numbers. The frequency modulated signals are then sent through M antennas and transmitted through a transmission channel 322. The transmission channel 322 is an effective MIMO channel and is represented as $H = H_{physical} \times W_{precoding}$. The effective MIMO channel response H thus includes the actual MIMO channel response ($H_{physical}$) and the spatial mapping matrix ($W_{precoding}$) used by the transmitter 301. As illustrated in FIG. 3, noise n 324 is added to the transmitted spatial streams 320 in the channel 322, and thus, the noise n 324 is considered to be added to the transmitted spatial streams 320 at an adder 325.

At the receiver 303, R antennas receive the M spatial streams 320, and each antenna provides a received signal to a soft-output MIMO detector 326. The receiver 303 processes the received signal in a manner complementary to the processing performed by the transmitter 301 to obtain M received symbols. The receiver 303 estimates the response of the MIMO channel 322 from the transmitter 301 to the receiver 303 based on the received symbols for a pilot and generates channel estimates. The soft-output MIMO detector 326 performs detection on the M received symbols with the channel estimates and provides soft decisions 330, which are represented by LLRs, to channel decoders 328. Specifically, the soft-output MIMO detector 326 provides K soft decisions for K code bits of the M data symbols.

The soft decisions 330 are received by the channel decoders 328, which generate decoded data 334. In an example, the detection and decoding is performed with a single pass through the soft-output MIMO detector 326 and the channel decoders 328. In another example, the detection and decoding is performed iteratively between the soft-output MIMO detector 326 and the channel decoder 328. If iterative detection and decoding is applied, the channel decoders 328 feed a priori probability (APP) feedback information 332 back to the soft-output MIMO detector 326. Using the APP feedback information 332, the soft-output MIMO detector 326 updates the LLR soft bit metrics 330. The updated soft bit metrics 330 are extrinsic LLRs that represent new information from the MIMO detector 326 to the decoders 328.

Figure 4:
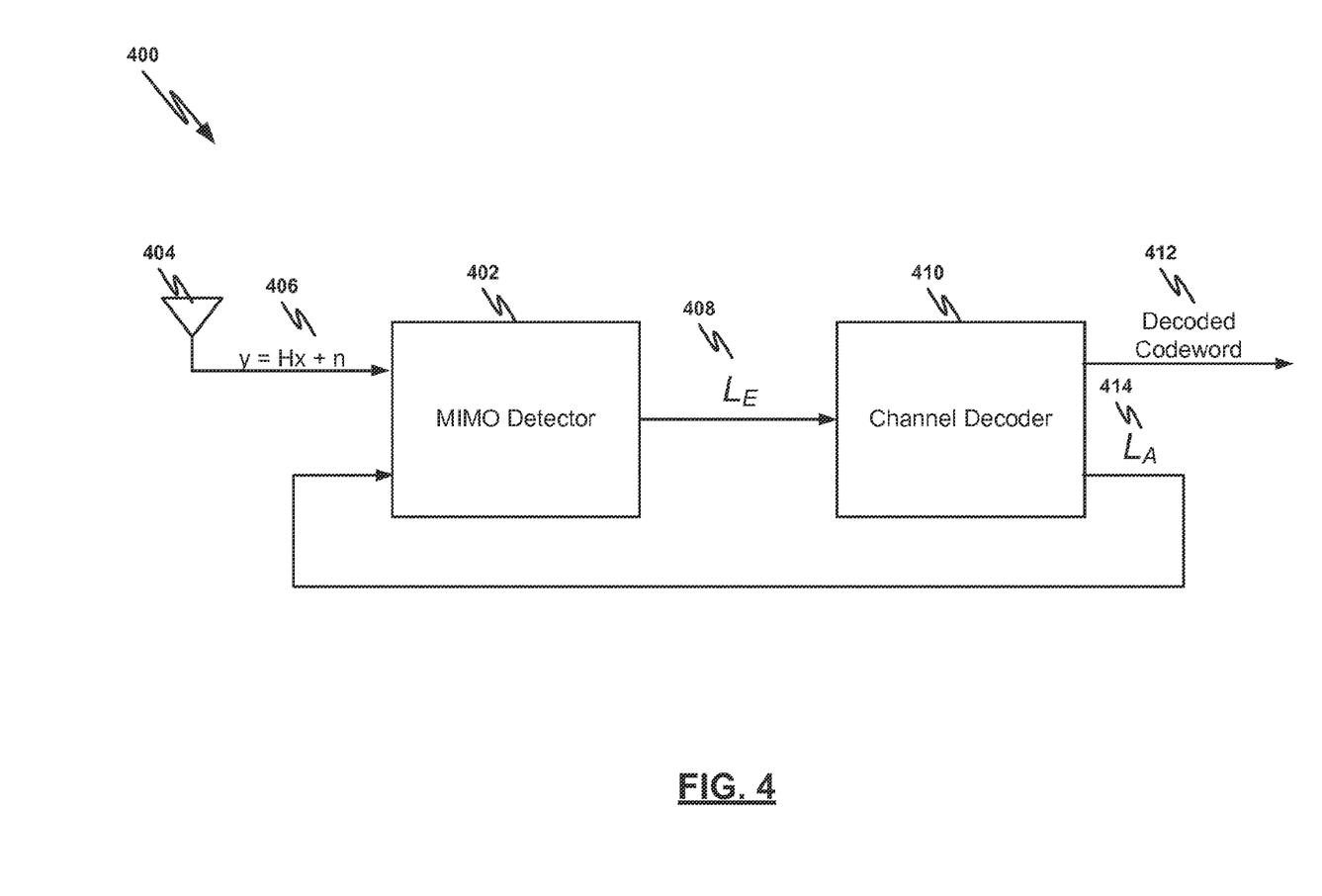
FIG. 4 is a block diagram including a MIMO detector that is configured to output extrinsic information $L_E$ to a channel decoder.

FIG. 4 is a block diagram 400 including a MIMO detector 402 that is configured to output extrinsic information $L_E$ 408 to a channel decoder 410. As illustrated in FIG. 4, the MIMO detector 402 is part of a receiver that includes an antenna 404 that is configured to receive a signal 406. In the example of FIG. 4, the MIMO detector 402 is a maximum a posteriori probability (MAP) detector that minimizes the error probability for each code bit and provides a soft decision for each code bit. The MAP detector 402 provides soft decisions in the form of LLRs to the channel decoder 410. The MAP detector 402 calculates the LLR of each code bit as:

$$L_D(b_n \mid y) = \log \frac{\sum\limits_{b \in B_{k,1}} p(y \mid b) \exp\left(\frac{1}{2} b^T L_A\right)}{\sum\limits_{b \in B_{k,0}} p(y \mid b) \exp\left(\frac{1}{2} b^T L_A\right)}, \quad \text{(Equation 5)}$$

where $L_D(b_n|y)$ is the LLR for a code bit $b_n$ given a received signal y, y is an M×1 vector with M data symbols received at the MAP detector 402, $b=[b_1 \ldots b_N]^T$ is a vector of all N bits in a transmitted symbol vector x, and $L_A=[L_A(b_1) \ldots L_A(b_N)]^T$ is a vector of APP LLR values for each bit of the N bits $b_1 \ldots b_N$.

The MAP detector 402 is a max-log-MAP detector. For the max-log-MAP detector, Equation 5 is approximated as follows:

$$L_D(b_n \mid y) \approx \underbrace{L_A(b_n)}_{\substack{a\ priori \\ probability}} + \underbrace{L_E(b_n)}_{\substack{extrinsic \\ information \\ for\ decoder}}, \quad \text{(Equation 6)}$$

$$L_E(b_n) \approx \max_{b:b_n=1}\left(-\frac{1}{\sigma^2}\|y-Hx\|^2 + \frac{1}{2}b_{[n]}^T L_{A,[n]}\right) - \\ \max_{b:b_n=0}\left(-\frac{1}{\sigma^2}\|y-Hx\|^2 + \frac{1}{2}b_{[n]}^T L_{A,[n]}\right), \quad \text{(Equation 7)}$$

where $L_A(b_n)$ is an APP LLR for the bit $b_n$ that is provided by the channel decoder 410 to the detector 402, $L_E(b_n)$ is the extrinsic information for the bit $b_n$ that is provided by the detector 402 to the channel decoder 410, x is a vector that is hypothesized to have been transmitted to the receiver, $\|y-Hx\|^2$ represents a Euclidian distance cost function, "$T$" denotes a transpose, and $\sigma^2$ is the variance of the noise added to the transmitted signal in the channel. Additionally, $b_{[n]}^T$ is a vector with all code bits in the vector b except for the bit $b_n$, and $L_{A,[n]}$ is a vector with APP LLRs for all code bits in $b_{[n]}^T$, such that the subscript $(.)_{[n]}$ represents the original vector or matrix without the n-th element or column. The $L_E(b_n)$ extrinsic information, as illustrated in FIG. 4 at 408, is the soft bit metric that is passed to the channel decoder 410. The $L_A(b_n)$ APP LLR, as illustrated in FIG. 4 at 414, is the feedback from the channel decoder 410 that is provided to the MIMO detector 402 in examples where iterative detection and decoding is used. In other examples, $L_A$ is assumed to be "0." The channel decoder 410 decodes the received data and generates decoded codewords 412.

Various methods are used to determine LLR values using Equations 6 and 7 (i.e., various methods are used to obtain $L_D(b_n|y)$ for a code bit $b_n$). For example, a signal y 406 received at the MIMO detector 402 represents a set of data symbols that are transmitted over a communication channel. In a first step in determining the LLR values, for a given bit $b_n$ belonging to a single data symbol $x_i$ of the set of data symbols, all possible $x_i$ values are exhausted with the bit $b_n=0$ or 1 to determine possible bit values for the single data symbol $x_i$ given the received signal y. In a second step, given the possible bit values for the single data symbol $x_i$, all of the rest of the data symbols of the set of data symbols are exhausted to determine possible bit values for the rest of the data symbols $x_{[i]}$. Aspects of the second step are expressed via the following equation:

$$\min_{b:b_n=b}\left(\frac{1}{\sigma^2}\|y-Hx\|^2 - \frac{1}{2}b_{[n]}^T L_{A,[n]}\right) = \\ \min_{x_i:b_n=b}\min_{x_{[i]}|x_i}\left(\frac{1}{\sigma^2}\left\|\underbrace{y-h_i x_i}_{y_i} - H_{[i]}x_{[i]}\right\|^2 - \frac{1}{2}b_{[n]}^T L_{A,[n]}\right). \quad \text{(Equation 8)}$$

For the given possible bit values of the single data symbol $x_i$, Equation 8 includes a minimization to determine the optimal bit values for bits in $x_{[i]}$. The minimization to determine the optimal $x_{[i]}$ bit values involves a computationally complex calculation. Without APP LLR values (i.e., $L_A=0$), Equation 8 includes an equivalent of a hard decision for $x_{[i]}$ as if the received signal is $y_i$. In an example, the equivalent of the hard decision is a bit-by-bit decision for a 2-stream MIMO system. In other examples, the equivalent of the hard decision is an approximated hard decision (e.g., a minimum mean square error (MMSE) decision). With non-trivial APP LLR values, the determination of $x_{[i]}$ is computationally complex. For example, for a 2-stream MIMO system, a joint decision is utilized instead of the bit-by-bit decision, and the joint decision causes computational complexity. Alternatively, the determination of the optimal bit values for $x_{[i]}$ includes a sub-optimal bit-by-bit decision with a slicer boundary adjusted by a corresponding APP LLR value.

The MIMO detector 402 uses an LLR combining technique to determine the optimal bit values for $x_{[i]}$ and decrease the computational complexity of the system of FIG. 4. In Equation 8, the cost function to determine $x_{[i]}$ includes two parts. The two parts include a Euclidian distance approximated via a maximum-likelihood (ML) detection technique, and the Euclidian distance is biased by an APP LLR value:

$$\min_{x_{[i]}|x_i}\left(\underbrace{\frac{1}{\sigma^2}\|y_i - H_{[i]}x_{[i]}\|^2}_{ML} - \underbrace{\frac{1}{2}b_{[n]}^T L_{A,[n]}}_{APP\ bias}\right), \quad \text{(Equation 9)}$$

where $(1/\sigma^2)\|y_i-H_{[i]}x_{[i]}\|^2$ represents the Euclidian distance cost function that is approximated via a maximum-likelihood approximation, and $(1/2)b_{[n]}^T L_{A,[n]}$ represents the APP LLR value that biases the maximum-likelihood Euclidian distance.

In the LLR combining technique, the maximum-likelihood approximation technique is used to output a soft bit metric for each bit included in $x_{[i]}$. The LLR value determined via the maximum-likelihood approximation is not biased by the APP LLR. Thus, in the LLR combining technique, rather than finding a hard decision for $x_{[i]}$, a first soft decision is generated for each bit in $x_{[i]}$ via the maximum-likelihood approximation, independent of the APP LLR. The first soft decision indicates a likelihood of a state of each bit in $x_{[i]}$ given the received data signal y and is not based on an APP value. The maximum-likelihood soft decision for each bit of $x_{[i]}$ is then bit-wise combined with an APP LLR value for each bit of $x_{[i]}$. The LLR combining technique thus includes combining the first soft decision with a second soft decision, where the second soft decision represents an a priori probability (APP) value for a bit, where the APP value is received from the decoder 410. The combining of the first and second soft decisions is expressed as follows:

$$b_m=1 \Leftrightarrow \text{LLR}(b_m|y_i)+L_A(b_m)>0 \Rightarrow x_{[i]}(x_i), \quad \text{(Equation 10)}$$

where a possible value for a bit $b_m$ is set equal to "1" if the summation of $\text{LLR}(b_m|y_i)$ and $L_A(b_m)$ is greater than zero. $\text{LLR}(b_m|y_i)$ represents the first soft decision that indicates a likelihood of a state of the bit $b_m$ given the received data signal $y_i$, and $L_A(b_m)$ represents the second soft decision that is an APP LLR for the bit $b_m$ that is received from the decoder 410. The possible bit values for each bit in $x_{[i]}$ given the possible bit values for $x_i$ (i.e., the portion $x_{[i]}(x_i)$ of Equation 10) is determined based on the combination of the first soft decision and the second soft decision. Although $LLR(b_m|y_i)$ is described above as being calculated via a maximum-likelihood approximation, in other examples, various different low complexity LLR algorithms and approximations are applied to obtain the $LLR(b_m|y_i)$ value.

The Euclidian distance for the given $x_i$ is determined based on the determined possible bit values in $x_{[i]}(x_i)$. A minimum for all $x_i$ with $b_n=0$ or $b_n=1$ is then determined over all possible $x_i$ to determine the extrinsic soft bit metric for the bit $b_n$ as follows:

$$L_E(b_n) = \qquad \text{(Eqaution 11)}$$

$$\min_{x_i:b_n=0}\left(\frac{1}{\sigma^2}\|y - h_i x_i - H_{[i]} x_{[i]}(x_i)\|^2 - \frac{1}{2}b_{[n]}^T L_{A,[n]}\right) -$$

$$\min_{x_i:b_n=1}\left(\frac{1}{\sigma^2}\|y - h_i x_i - H_{[i]} x_{[i]}(x_i)\|^2 - \frac{1}{2}b_{[n]}^T L_{A,[n]}\right).$$

In an example, certain LLR values are stored to reduce a number of computations in the MIMO detector 402. For example, in FIG. 4, the determination of the possible bit values in $x_{[i]}$ involves multiple iterations. As illustrated in Equation 12 below, in determining a possible bit value for a bit $b_m$ in $x_{[i]}$, the first soft decision $LLR(b_m|y_i)$ is constant over the multiple iterations, while the second soft decision $L_A(b_m)$ is updated during the multiple iterations:

$$LLR(b_m \mid y_i) = \qquad \text{(Equation 12)}$$

$$\min_{b_m=0}\frac{1}{\sigma^2}\|y_i - H_{[i]}x_{[i]}\|^2 - \min_{b_m=1}\frac{1}{\sigma^2}\|y_i - H_{[i]}x_{[i]}\|^2$$

$$\underbrace{b_m = 1}_{\text{decision per iteration}} \Leftrightarrow \underbrace{LLR(b_m \mid y_i)}_{\text{constant over iteration}} + \underbrace{L_A(b_m)}_{\text{updated per iteration}} > 0.$$

As indicated in Equation 12, if iterative detection and decoding is used, the APP LLR $L_A(b_m)$ is updated and fed back each iteration, and the bit decision for $b_m$ is also updated each iteration. By contrast, the first soft decision $LLR(b_m|y_i)$ that is conditioned on $y_i$ is determined during a first iteration of the multiple iterations and thereafter fixed and not recalculated during the subsequent iterations. Thus, in the example, the first soft decision $LLR(b_m|y_i)$ is stored after the first iteration to eliminate duplicative LLR calculation. Using the stored first soft decision $LLR(b_m|y_i)$, subsequent bit detection is of a lower complexity and includes a comparison.

The storing of the first soft decision $LLR(b_m|y_i)$ requires a relatively large size of storage. To reduce the size of storage required, the first soft decision $LLR(b_m|y_i)$ is compressed. In one example, the first soft decision $LLR(b_m|y_i)$ is compressed based on a correlation between the first soft decision LLR $(b_m|y_i)$ and the received signal $y_i$. The $LLR(b_m|y_i)$ value is conditioned differently than the $y_i$ value but is highly correlated. Storing the first soft decision LLR value also frees a buffer for saving the channel matrix and received signals for iterative decoding and detection.

As described above, the optimal MIMO receiver performs an exhaustive search over all possible sequences of data bits that might have been transmitted for a packet to find the sequence that is most likely to have been transmitted. The LLR combining technique described herein is a low complexity, suboptimal solution with close-to-optimal performance. To improve the LLR combining, a value based on the LLR can be used to improve the LLR combining.

$$b_m=1 \Leftrightarrow f_1(LLR(b_m|y_i))+f_2(L_A(b_m))>0$$

For example, LLR scaling is used to improve aspects of the suboptimal LLR combining technique (function $f_1$ is $f_1(x)=x$, and function $f_2$ is $f_2(x)=\text{alpha}*x$). For example, in Equation 10, a first soft decision, $LLR(b_m|y_i)$, is combined with a second soft decision, $L_A(b_m)$, to determine possible bit values in $x_{[i]}$. In the example utilizing the LLR scaling, the second soft decision $L_A(b_m)$ is scaled by a weighting factor $\alpha_m$ (i.e., a scaling factor), as illustrated in Equation 13 below:

$$b_m=1 \Leftrightarrow LLR(b_m|y_i)+\alpha_m L_A(b_m)>0. \qquad \text{(Equation 13)}$$

In an example, the weighting factor $\alpha_m$ is based on a reliability of the second soft decision $L_A(b_m)$. Because $b_m$ is determined based on a sign of the combined LLR (i.e., the sum of $LLR(b_m|y_i)$ and $L_A(b_m)$), in another example, LLR $(b_m|y_i)$ is scaled instead of $L_A(b_m)$. In yet another example, both of $LLR(b_m|y_i)$ and $L_A(b_m)$ are scaled by one or more weighting factors. In various examples utilizing the LLR scaling, the weighting factor is chosen in an adaptive method. When the adaptive method is used, the adaptive weighting factors are based on reliability, normalized or un-normalized absolute values for the APP LLR, SNR/SINR values, or various other metrics. In an example of the adaptive method, where the possible bit values are determined over multiple iterations, the weighting factor is updated over each iteration of the multiple iterations. In other examples utilizing the LLR scaling, the weighting factor is chosen to be a constant value.

In certain examples where the weighting factor is used, the weighting factor is chosen with different granularities, where the different granularities include a "per bit" granularity or "per group of bits" granularity. If bits are grouped in a symbol, then a single weighting factor is used per symbol. If the bits are all grouped together, one weighting factor is used for all of the bits. Additionally, in an example, the weighting factor is set $\alpha=0$, such that the determination of the possible bit value for $b_m$ is a maximum-likelihood decision for $x_{[i]}$, and the MAP detector 402 only uses the APP LLR in determining $x_i$ (i.e., the APP feedback is used only in determining $x_i$, and is not used in determining $x_{[i]}$).

In an example, bits of $x_{[i]}$ are partitioned into groups. As described above, bit decisions for $x_{[i]}$ given $x_i$ or $y_i$ are made. Alternatively, in the example where the bits of $x_{[i]}$ are partitioned into the groups, a bit decision for $X_{[S(i),i]}$ given $X_{S(i)}$ is possible, as illustrated in Equations 14-18:

$$y_{S(i)} = y_i - \sum_{m \in S(i)} h_m s_m, \qquad \text{(Equation 14)}$$

$$S(i)=\{m_1 \ldots m_{|S(i)|}\}, \qquad \text{(Equation 15)}$$

$$\bar{S}(i)=\{1 \ldots i-1\ i+1 \ldots N\}\backslash S(i), \qquad \text{(Equation 16)}$$

$$LLR(b_m \mid y_{S(i)}) = \min_{b_m=0} \frac{1}{\sigma^2} \|y_{S(i)} - H_{[S(i),i]} x_{[S(i),i]}\|^2 - \quad \text{(Equation 17)}$$

$$\min_{b_m=1} \frac{1}{\sigma^2} \|y_{S(i)} - H_{[S(i),i]} x_{[S(i),i]}\|^2,$$

$$b_m=1 \Leftrightarrow LLR(b_m \mid y_{S(i)}) + L_A(b_m) > 0 \Rightarrow x_n, n \in \overline{S}(i). \quad \text{(Equation 18)}$$

In the example, using the bit decision for $X_{[S(i), i]}$ given $X_{s(i)}$, an optimal bit decision for $X_{s(i)}$ is made according to Equations 19 and 20:

$$y_{\overline{S}(i)} = y_i - \sum_{m \in S(i)} h_m s_m, \quad \text{(Equation 19)}$$

$$\min_{x_{[i,S(i)]}} \left( \frac{1}{\sigma^2} \|y_{\overline{S}(i)} - H_{[\overline{S}(i),i]} x_{[\overline{S}(i),i]}\|^2 - \frac{1}{2} b_{[n]}^T L_{A,[n]} \right) \Rightarrow \quad \text{(Equation 20)}$$

$$x_n, n \in S(i).$$

In the partitioning example illustrated above, the bits of $x_{[i]}$ are broken into two groups. In a first group of the two groups, a suboptimal bit decision for a bit in $x_{[i]}$ given $x_i$ is used. In an example, the suboptimal bit decision is determined via the LLR combining methodology described above. In a second group of the two groups, an optimal bit decision for a bit in $x_{[i]}$ given $x_i$ is used. In an example, the optimal bit decision includes an exhaustive search methodology. The order of optimal and suboptimal bit detection can be varied, such that in a first example, an exhaustive search is performed before a suboptimal bit decision, and in a second example, a suboptimal bit decision is performed before an exhaustive search.

Figure 5:
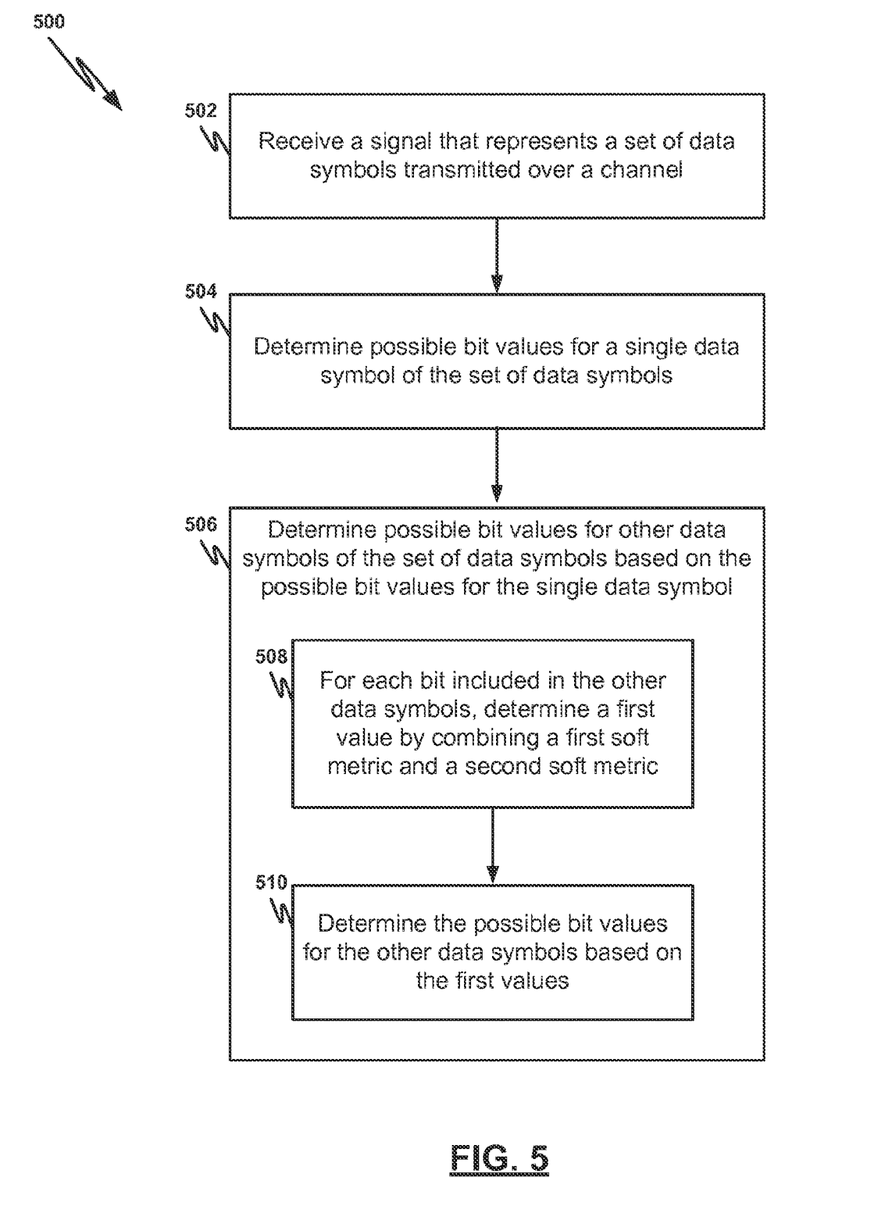
FIG. 5 is a flowchart illustrating an example method for detecting data in a received MIMO signal.

FIG. 5 is a flowchart 500 illustrating an example method for detecting data in a received MIMO signal. At 502, a digital signal that represents a set of data symbols transmitted over a communication channel is received. At 504, possible bit values for a single data symbol of the set of data symbols are determined based on the received digital signal. At 506, possible bit values for other data symbols of the set of data symbols are determined based on the possible bit values for the single data symbol. Determining the possible bit values for the other data symbols includes, at 508, determining a first value for each bit included in the other data symbols. The first value is determined by combining i) a first soft metric indicating a likelihood of a state of the bit given the received signal, and ii) a second soft metric representing an a priori probability (APP) for the bit that is received from a decoder. The first soft metric is not based on the APP for the bit. At 510, the possible bit values for the other data symbols are determined based on the first values.

This written description uses examples to disclose the invention, including the best mode, and also to enable a person skilled in the art to make and use the invention. The patentable scope of the invention includes other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method of detecting data in a received multiple-input-multiple-output (MIMO) signal, the method comprising:
   receiving a signal that represents a set of data symbols transmitted over a communication channel;
   determining possible bit values for a single data symbol of the set of data symbols based on the received signal; and
   determining possible bit values for other data symbols of the set of data symbols based on the possible bit values for the single data symbol, wherein determining the possible bit values for the other data symbols includes:
      for each bit included in the other data symbols, determining a first value by combining i) a first soft metric indicating a likelihood of a state of the bit given the received signal, and ii) a second soft metric representing an a priori probability (APP) for the bit, wherein the APP for the bit is received from a decoder,
      wherein the first soft metric is not based on the APP for the bit, and
      determining the possible bit values for the other data symbols based on the first values.

2. The method of claim 1, wherein the first soft metric and the second soft metric are combined by summing (i) the first soft metric for a bit of the set of data symbols, and (ii) the second soft metric for the bit, wherein one or both of the first and second soft metrics are scaled by a weighting factor in the summation.

3. The method of claim 1, further comprising:
determining the first soft metric via a maximum likelihood approximation, wherein the maximum likelihood approximation is not based on the APP for the bit.

4. The method of claim 1, further comprising:
determining extrinsic information $L_E(b_n)$ by solving an equation:

$$L_E(b_n) = \min_{x_i : b_n = 0}\left(\frac{1}{\sigma^2}\|y - h_i x_i - H_{[i]}x_{[i]}(x_i)\|^2 - \frac{1}{2}b_{[n]}^T L_{A,[n]}\right) - \min_{x_i : b_n = 1}\left(\frac{1}{\sigma^2}\|y - h_i x_i - H_{[i]}x_{[i]}(x_i)\|^2 - \frac{1}{2}b_{[n]}^T L_{A,[n]}\right),$$

where $b_n$ is equal to 0 or 1, $x_i$ represents the single data symbol, $\sigma^2$ represents a variance of white Gaussian noise of the communication channel, y represents the received signal, $h_i$ represents an effect of the communication channel on the single data symbol, $H_{[i]}$ represents an effect of the communication channel on the other data symbols, $x_{[i]}$ represents the other data symbols, $b_{[n]}^T$ represents bits in the other data symbols, and $L_{A,[n]}$ represents APP log likelihood ratio (LLR) values for the bits in $b_{[n]}^T$; and
providing the extrinsic information $L_E(b_n)$ to the decoder, wherein the decoder generates decoded data based on the extrinsic information $L_E(b_n)$.

5. The method of claim 1, wherein the possible bit values for the other data symbols are determined over multiple iterations, the method further comprising:
determining the first soft metric during a first iteration of the multiple iterations, wherein the first soft metric is not recalculated again during other iterations of the multiple iterations;
storing the first soft metric after the determining of the first soft metric; and
determining the second soft metric during the first iteration, wherein the second soft metric is recalculated during the other iterations of the multiple iterations.

6. The method of claim 5, further comprising:
compressing the first soft metric, wherein the compressing of the first soft metric decreases an amount of space required for the storing of the first soft metric.

7. The method of claim 6, wherein the compressing is based on a correlation between the first soft metric and the received signal.

8. The method of claim 1, wherein in combining the first soft metric and the second soft metric, the second soft metric is scaled by a weighting factor $\alpha_m$, wherein the weighting factor $\alpha_m$ is based on a reliability of the second soft metric, and wherein the first value is determined via an equation first_value=$LLR(b_m|y_i)+\alpha_m L_A(b_m)$, where first_value represents the first value, $LLR(b_m|y_i)$ represents the first soft metric for bit $b_m$ of the set of data symbols, and $L_A(b_m)$ represents the second soft metric for the bit $b_m$.

9. The method of claim 8, wherein the possible bit values for the other data symbols are determined over multiple iterations, the method further comprising:
updating the weighting factor $\alpha_m$ over each iteration of the multiple iterations.

10. The method of claim 1, further comprising:
partitioning the bits of the other data symbols into a first group and a second group;
utilizing a search methodology to determine the possible bit values for the bits of the first group, wherein the search methodology does not include the combining of the first soft metric and the second soft metric; and
determining the possible bit values for the bits of the second group without utilizing the search methodology, wherein the determining of the possible bit values for the bits of the second group includes the combining of the first soft metric and the second soft metric.

11. A system for detecting data in a received multiple-input-multiple-output (MIMO) signal, the system comprising:
one or more antennas configured to receive, via a communication channel, a signal that represents a set of data symbols transmitted over the communication channel; and
a detector coupled to the one or more antennas, wherein the detector is configured to:
determine possible bit values for a single data symbol of the set of data symbols based on the received signal; and
determine possible bit values for other data symbols of the set of data symbols based on the possible bit values for the single data symbol, wherein determining the possible bit values for the other data symbols includes:
for each bit included in the other data symbols, determining a first value by combining i) a first soft metric indicating a likelihood of a state of the bit given the received signal, and ii) a second soft metric representing an a priori probability (APP) for the bit, wherein the APP for the bit is received from a decoder,
wherein the first soft metric is not based on the APP for the bit, and
determining the possible bit values for the other data symbols based on the first values.

12. The system of claim 11, wherein the first soft metric and the second soft metric are combined by summing (i) the first soft metric for a bit of the set of data symbols, and (ii) the second soft metric for the bit, wherein one or both of the first and second soft metrics are scaled by a weighting factor in the summation.

13. The system of claim 11, wherein the first soft metric is determined via a maximum likelihood approximation, and wherein the maximum likelihood approximation is not based on the APP for the bit.

14. The system of claim 11, wherein the detector is configured to determine extrinsic information $L_E(b_n)$ by solving an equation:

$$L_E(b_n) = \min_{x_i : b_n = 0}\left(\frac{1}{\sigma^2}\|y - h_i x_i - H_{[i]}x_{[i]}(x_i)\|^2 - \frac{1}{2}b_{[n]}^T L_{A,[n]}\right) - \min_{x_i : b_n = 1}\left(\frac{1}{\sigma^2}\|y - h_i x_i - H_{[i]}x_{[i]}(x_i)\|^2 - \frac{1}{2}b_{[n]}^T L_{A,[n]}\right),$$

where $b_n$ is equal to 0 or 1, $x_i$ represents the single data symbol, $\sigma^2$ represents a variance of white Gaussian noise of the communication channel, y represents the received signal, $h_i$ represents an effect of the communication channel on the single data symbol, $H_{[i]}$ represents an effect of the communication channel on the other data symbols, $x_{[i]}$ represents the other data symbols, $b_{[n]}^T$ represents bits in the other data symbols, and $L_{A,[n]}$ represents APP log likelihood ratio (LLR) values for the bits in $b_{[n]}^T$, wherein the extrinsic information $L_E(b_n)$ is provided to the decoder, the decoder generating decoded data based on the extrinsic information $L_E(b_n)$.

15. The system of claim 11, wherein the possible bit values for the other data symbols are determined over multiple iterations, and wherein the detector is further configured to:
   determine the first soft metric during a first iteration of the multiple iterations, wherein the first soft metric is not recalculated during other iterations of the multiple iterations;
   store the first soft metric after the determining of the first soft metric; and
   determine the second soft metric during the first iteration, wherein the second soft metric is recalculated during the other iterations of the multiple iterations.

16. The system of claim 15, wherein the first soft metric is compressed, and wherein the compressing of the first soft metric decreases an amount of space required for the storing of the first soft metric.

17. The system of claim 16, wherein the compressing is based on a correlation between the first soft metric and the received signal.

18. The system of claim 11, wherein in combining the first soft metric and the second soft metric, the second soft metric is scaled by a weighting factor $\alpha_m$, wherein the weighting factor $\alpha_m$ is based on a reliability of the second soft metric, and wherein the first value is determined via an equation $$\text{first\_value} = \text{LLR}(b_m|y_i) + \alpha_m L_A(b_m),$$

where first_value represents the first value, $\text{LLR}(b_m|y_i)$ represents the first soft metric for a bit $b_m$ of the set of data symbols, and $L_A(b_m)$ represents the second soft metric for the bit $b_m$.

19. The system of claim 18, wherein the possible bit values for the other data symbols are determined over multiple iterations, and wherein the weighting factor $\alpha_m$ is updated over each iteration of the multiple iterations.

20. The system of claim 11, wherein the bits of the other data symbols are partitioned into a first group and a second group; wherein a search methodology is utilized to determine the possible bit values for the bits of the first group; wherein the search methodology does not include the combining of the first soft metric and the second soft metric; wherein the possible bit values for the bits of the second group are determined without utilizing the search methodology; and wherein the determining of the possible bit values for the bits of the second group includes the combining of the first soft metric and the second soft metric.

* * * * *